United States Patent
Lee et al.

(10) Patent No.: US 8,781,804 B2
(45) Date of Patent: Jul. 15, 2014

(54) METHOD OF ESTIMATING LOAD CARRYING CAPACITY OF BRIDGE

(75) Inventors: Chang-Geun Lee, Hwaseong (KR); Won-Tae Lee, Hwaseong (KR)

(73) Assignee: Expressway & Transportation Research Institute, Korea Expressway Corporation, Hwaseong, Gyeonggi-Do (KR)

( * ) Notice: Subject to any disclaimer, the term of this patent is extended or adjusted under 35 U.S.C. 154(b) by 664 days.

(21) Appl. No.: 12/902,928

(22) Filed: Oct. 12, 2010

(65) Prior Publication Data

US 2012/0089378 A1    Apr. 12, 2012

(51) Int. Cl.
*G06F 7/60* (2006.01)
*G06G 7/48* (2006.01)
*G01M 5/00* (2006.01)

(52) U.S. Cl.
CPC .............. *G01M 5/0008* (2013.01); *G01M 5/00* (2013.01); *G01M 5/0066* (2013.01); *G01M 5/0041* (2013.01)
USPC ...................................... 703/7; 703/2; 703/6

(58) Field of Classification Search
None
See application file for complete search history.

(56) References Cited

U.S. PATENT DOCUMENTS

| | | | | |
|---|---|---|---|---|
| 4,567,774 | A * | 2/1986 | Manahan et al. | 73/826 |
| 5,978,998 | A * | 11/1999 | Shivaram | 14/75 |
| 6,434,492 | B1 * | 8/2002 | Pollack et al. | 702/41 |
| 7,231,318 | B2 * | 6/2007 | Kihira et al. | 702/184 |
| 2011/0093219 | A1 * | 4/2011 | Parker et al. | 702/34 |

OTHER PUBLICATIONS

"The determination of bridge displacement using measured acceleration", Park et al. © 2004 Elsevier Ltd.*
"Structural reliability of concrete bridges including improved chloride-induced corrosion models", Vu et al. © 2000 Elsevier Science Ltd.*
"The effect of corrosion on the natural frequency and modal damping of reinforced concrete beams", Razak et al. ©2001 Elsevier Science Ltd.*
"Load Rating of Arch Bridges", Chajes, Michael. Department of Civil and Environmental Engineering, College of Engineering, University of Delaware. Oct. 2002.*

* cited by examiner

*Primary Examiner* — Omar Fernandez Rivas
*Assistant Examiner* — Nithya J Moll
(74) *Attorney, Agent, or Firm* — Edwards Wildman Palmer LLP

(57) ABSTRACT

Provided is a method of estimating a load carrying capacity of a bridge. The load carrying capacity estimation method includes the steps of: estimating a mode coefficient of the bridge using an acceleration signal obtained from an accelerometer that is installed in the bridge; updating an analysis model of the bridge using the estimated mode coefficient; and estimating a rating factor of the bridge by applying a dead load and a design live load to the updated analysis model.

4 Claims, 8 Drawing Sheets

METHOD OF ESTIMATING LOAD CARRYING CAPACITY OF BRIDGE

BACKGROUND

1. Technical Field

The present invention relates to a method of estimating a load carrying capacity of a bridge, and more particularly, to a method of estimating a load carrying capacity of a bridge by measuring acceleration by oscillation of the bridge.

2. Related Art

There is a method of estimating a load carrying capacity of a bridge as a method of judging whether or not repair, reinforcement or replacement of a bridge is needed.

A load carrying capacity of a bridge is expressed as a multiplication of a design live load $P_r$, a rating factor RF, a deflection correction coefficient $K_\delta$ (or a stress correction coefficient $K_\epsilon$), an impact correction coefficient $K_i$, a traffic load correction coefficient $K_t$ and a pavement illumination correction coefficient $K_r$, and is expressed as the following equation (1).

$$P = P_r \times RF \times K_\delta (\text{or } K_\epsilon) \times K_i \times K_t \times K_r \qquad (1)$$

Here, $P_r$ is a given design live load, RF is a value that is obtained through an analysis of a finite element analysis model of a bridge, and $K_t$ and $K_r$ are values that are experimental or empirically determined.

Meanwhile, $K_\delta$ (or $K_\epsilon$) and $K_i$ are estimated through a loading test that uses a truck. Here, $K_\delta$ (or $K_\epsilon$) are estimated through a static loading test, and $K_i$ is estimated through a dynamic loading test.

As described above, the conventional method of estimating a load carrying capacity accompanies a loading test in order to determined $K_i$, to accordingly require a traffic load that passes a bridge to be intercepted wholly or partially. Therefore, according to the conventional load carrying capacity estimation method, there are problems that induce a traffic congestion to thus cause a lot of discomforts and economic damages.

In addition, there is a problem that it is hard to calculate a load carrying capacity of a bridge through the conventional load carrying capacity estimation method in the case of an important bridge of a heavy traffic load where a lot of vehicles pass a bridge.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

To overcome inconveniences of the conventional art, it is an object of the present invention to provide a method of estimating a load carrying capacity of a bridge, without intercepting a vehicle or vehicles that pass the bridge.

To achieve the object, according to an aspect of the present invention, there is provided a method of estimating a load carrying capacity of a bridge, the load carrying capacity estimation method comprising the steps of:

estimating a mode coefficient of the bridge using an acceleration signal obtained from an accelerometer that is installed in the bridge;

updating an analysis model of the bridge using the estimated mode coefficient; and estimating a rating factor of the bridge by applying a dead load and a design live load to the updated analysis model.

As descried above, a method of estimating a load carrying capacity of a bridge according to the present invention can effectively estimate the load carrying capacity of the bridge, without intercepting traffic that passes the bridge. Thus, the load carrying capacity estimation method according to the present invention can effectively prevent inconveniences and economic losses due to a traffic congestion based on traffic interception.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE DISCLOSURE

Hereinbelow, a method of estimating a load carrying capacity of a bridge according to a first embodiment of the present invention, will be described with reference to the accompanying drawings.

Figure 1:
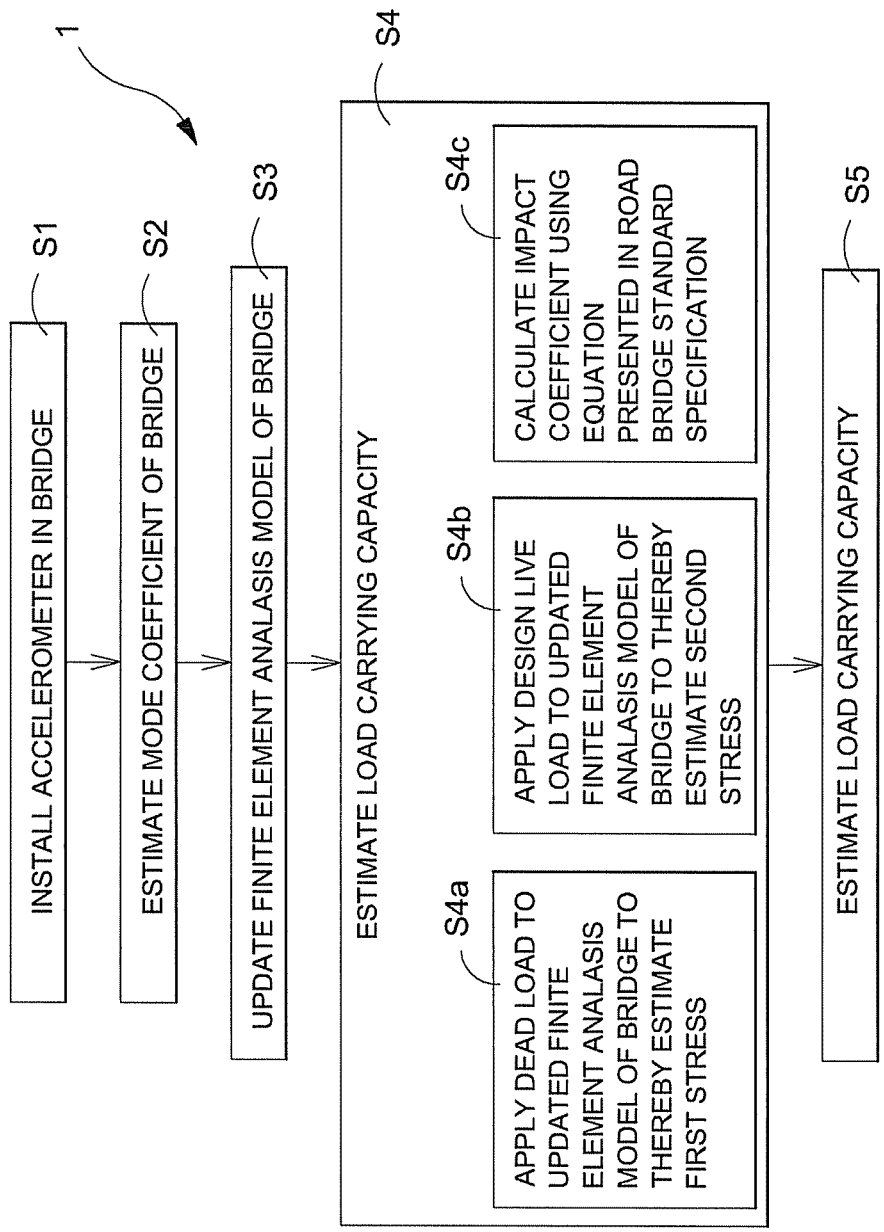
FIG. 1 is a flowchart view schematically showing a method of estimating a load carrying capacity of a bridge according to a first embodiment of the present invention.
Figure 2:
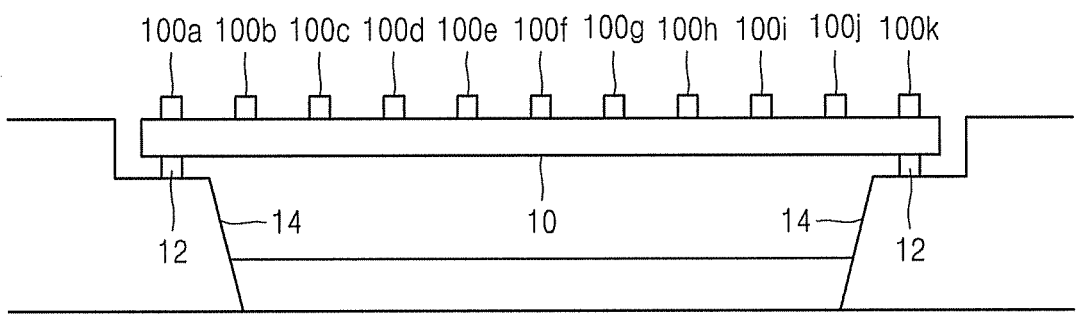
FIG. 2 is a side elevational view schematically showing a bridge.
Figure 3:
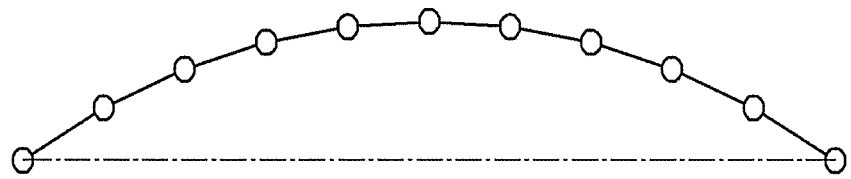
FIG. 3 is a diagram schematically showing a primary mode shape of the bridge that is illustrated in FIG. 2.
Figure 4:
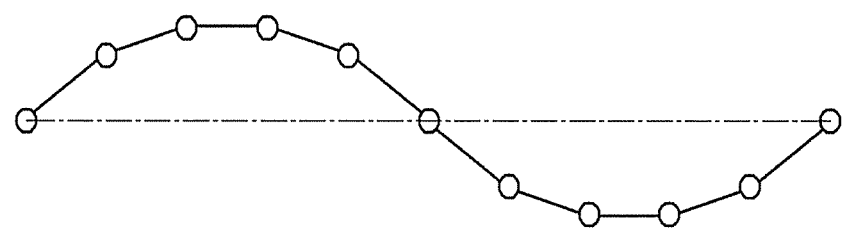
FIG. 4 is a diagram schematically showing a secondary mode shape of the bridge that is illustrated in FIG. 2.
Figure 5:
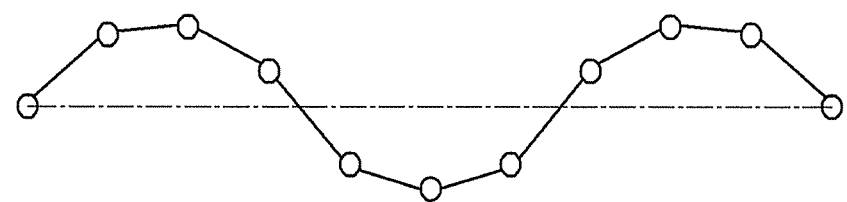
FIG. 5 is a diagram schematically showing a tertiary mode shape of the bridge that is illustrated in FIG. 2.
Figure 6:
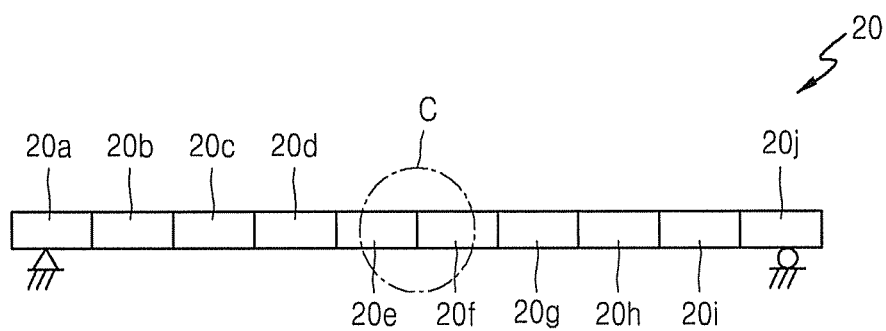
FIG. 6 is a side view schematically showing a finite element analysis model of the bridge that is illustrated in FIG. 2.

FIG. 1 is a flowchart view schematically showing a method of estimating a load carrying capacity of a bridge according to a first embodiment of the present invention, and FIG. 2 is a side elevational view schematically showing a bridge. FIGS. 3 to 5 are diagrams schematically showing primary through tertiary mode shapes of the bridge that is illustrated in FIG. 2, respectively. FIG. 6 is a side view schematically showing a finite element analysis model of the bridge that is illustrated in FIG. 2.

Referring to FIG. 1, a method 1 of estimating a load carrying capacity of a bridge according to the first embodiment of the present invention includes an accelerometer installation step S1, a mode coefficient estimation step S2, an analysis model updating step S3, a rating factor estimating step S4 and a load carrying capacity estimation step S5.

The accelerometer installation step S1 is a step of installing an accelerometer in a bridge. As illustrated in FIG. 2, the bridge 10 is arranged at the upper side of piers 14, and is combined with the piers 14 by bearings 12, respectively. A plurality of accelerometers 100a to 100k are arranged at a plurality of points of the bridge 10. An arrangement pattern of the accelerometers 100a to 100k is determined properly by forecasting a mode shape of the bridge.

If the accelerometers 100a to 100k are installed in the bridge 10, acceleration is actually measured at each point of the bridge 10 using each of the accelerometers 100a to 100k. The bridge 10 is oscillated by a vehicle or vehicles and so on that pass the upper side of the bridge 10, and the accelerometers 100a to 100k measure acceleration due to the oscillation. It is desirable to measure acceleration for sufficient time using accelerometers 100a to 100k, to thereby sufficiently accumulate an acceleration signal at each point of the bridge 10.

Next, the mode coefficient estimation step S2 proceeds.

The mode coefficient estimation step S2 is a step of estimating a mode coefficient of the bridge 10, that is, a natural frequency, a mode shape, an attenuation ratio, etc., using the accumulated acceleration signal.

Various structural system identification methods are known as a method of extracting a mode coefficient of the bridge 10 from actually measured acceleration. F.D.D (frequency domain decomposition), S.S.A (stochastic subspace algorithm), etc., are known as the structural system identification methods. Since the structural system identification methods are known by a number of publications, the specific description thereof will be omitted.

Through the structural system identification methods, a mode coefficient that corresponds to a number of oscillation modes of the bridge 10 is estimated. That is, through the structural system identification methods, a natural frequency, a mode shape, an attenuation ratio, etc., are estimated with respect to each oscillation mode of the bridge 10.

Meanwhile, behavior of the bridge 10 can be expressed as mode superposition of a number of oscillation modes. In general, behavior of the bridge 10 is approximately expressed by superposing only a few of oscillation modes of low frequency, in many cases. Hereinbelow, a case of approximately expressing behavior of the bridge 10 by using only primary to tertiary oscillation modes of the lowest frequency will be described as an example.

Three natural frequencies that are the lowest frequencies among the natural frequencies of the bridge 10, that is, first to third natural frequencies are estimated from the acceleration signals obtained from the plurality of the accelerometers 100a to 100k that are placed in the bridge 10, using the structural system identification methods. In addition, primary to tertiary mode shapes and attenuation ratios are estimated in correspondence to the first to third natural frequencies, respectively. The primary to tertiary mode shapes has the same patterns as those shown in FIGS. 3 to 5, respectively. As shown in FIGS. 3 to 5, since the number of joint s of each mode shape is the same as the number of accelerometers, a more number of accelerometers may be installed in the bridge 10 in order to get a more specific mode shape.

Next, the analysis model updating step S3 proceeds.

The analysis model updating step S3 is a step of altering an initial analysis model of the bridge using the mode coefficient estimated in the mode coefficient estimation step S2. The initial analysis model of the bridge is formed of a finite element analysis model in this embodiment of the present invention.

The initial finite element analysis model 20 of the bridge 10 is formed of a plurality of elements 20a to 20j as illustrated in FIG. 6. Each of the elements 20a to 20j has parameters such as the modulus of elasticity, the moment of inertia of section, thickness, and torsional moment of section.

The mode coefficient of the bridge 10 can be obtained from the initial finite element analysis model 20, and the mode coefficient is determined according to the parameter values.

Meanwhile, the mode coefficient that is estimated from the initial finite element analysis model 20 may differ from a mode coefficient estimated from actually measured acceleration. Therefore, in the analysis model updating step S3, the parameter value of each element 20a to 20j of the initial finite element analysis model 20 is changed, the mode coefficient that is estimated from the initial finite element analysis model 20 and the mode coefficient estimated from the actually measured acceleration have values that are respectively close to each other at maximum. In this way, the initial finite element analysis model 20 is updated to have a mode coefficient similar to the mode coefficient estimated from the measure acceleration, to thus make the updated finite element analysis model 20 reflect the actual state of the bridge 10.

Various optimization algorithms can be used as the method of altering the parameters of the initial finite element analysis model 20 so that the mode coefficient that is estimated from the initial finite element analysis model 20 and the mode coefficient estimated from the actually measured acceleration are approximated to each other at maximum. There are a neural network technique, a gene algorithm, a down hill simplex technique, etc., as these optimization algorithms. Since these are known by a number of publications, the detailed explanation thereof will be omitted.

Next, the rating factor estimation step S4 proceeds.

The rating factor estimation step S4 is a step of estimating a rating factor by applying a dead load and a design live load to the updated finite element analysis model.

The rating factor is a value that represents a ratio of the live load that the bridge 10 can cope with the design live load, and estimated by a permission stress method, a strength design method, etc. In most cases, the rating factor is estimated by the permission stress method in the case of a steel bridge, and the rating factor is estimated by the permission stress method or the strength design method in the case of a concrete bridge.

It is desirable that the rating factor is estimated with respect to a portion that is predicted to be weak in the bridge 10. For example, the bridge 10 that is illustrated in FIG. 2 produces a maximum bending moment at the central portion of the bridge 10. Accordingly, it is desirable that the rating factor is obtained at a portion that corresponds to the central portion of the bridge 10, that is, at the central portion "C" of the finite element analysis model 20.

The load carrying capacity of the bridge 10 is estimated by using the permission stress method in this embodiment of the present invention, and the rating factor estimation step S4 of this embodiment of the present invention includes a first stress estimation step S4a, a second stress estimation step S4b and an impact coefficient estimation step S4c.

The first stress estimation step S4a is a step of estimating a first stress that occurs at the central portion of the bridge 10, by applying a dead load to the updated finite element analysis model, and the second stress estimation step S4b is a step of estimating a second stress that occurs at the central portion of the bridge 10, by applying a design live load to the updated finite element analysis model.

The impact coefficient estimation step S4c is a step of estimating an impact coefficient using a formula presented in the road bridge standard specification, and the impact coefficient is expressed by the following mathematical expression (2).

$$i_{code} = \frac{15}{40+L} \leq 0.3 \qquad (2)$$

Here, $i_{code}$ is an impact coefficient, and L is length of the bridge 10.

If the first stress, the second stress and the impact coefficient that are obtained through the above-described process are substituted to the following equation (3), the rating factor can be estimated.

$$RF = \frac{\sigma_a - \sigma_d}{\sigma_l(1+i_{code})} \qquad (3)$$

Here, RF denotes a rating factor, $\sigma_a$ denotes an allowable stress of a member, $\sigma_d$ denotes the first stress that is estimated by applying the dead load to the updated finite element analysis model, and $\sigma_l$ denotes the second stress that is estimated by applying the design live load to the updated finite element analysis model.

That is, the load carrying capacity estimation method 1 according to this embodiment of the present invention estimates a rating factor by using the finite element analysis model that has been updated by using the actually measured acceleration, unlike the conventional load carrying capacity estimation method that estimates the rating factor by using the initial finite element analysis model 20.

Since the load carrying capacity estimation method 1 for the bridge according to this embodiment of the present invention estimates the rating factor by using the finite element analysis model that has been updated by using the actually measured acceleration, a stress that is actually acted on the bridge 10 is reflected on the rating factor that has been estimated in this embodiment of the present invention.

Next, the load carrying capacity estimation step S5 proceeds.

The load carrying capacity estimation step S5 is a step of estimating the load carrying capacity of the bridge 10 from the rating factor that has been estimated by the above-described processes.

The load carrying capacity is obtained from the equation (1). Since a stress that is actually acted on the bridge 10 is already reflected on the rating factor, unlike the conventional load carrying capacity estimation method, in the case of the load carrying capacity estimation method 1 for the bridge according to this embodiment of the present invention, There is no need to separately obtain the deflection correction coefficient $K_\epsilon$ (or the stress correction coefficient $K_\epsilon$). That is, the deflection correction coefficient $K_\epsilon$ is set as one (1).

The deflection correction coefficient $K_\delta$ is a value that is obtained by a static loading test. Since there is no need to estimate the deflection correction coefficient $K_\delta$ in the load carrying capacity estimation method 1 for the bridge according to this embodiment of the present invention, no static loading test is required. Therefore, there is no need to block roads in order to perform a static loading test and thus there is no discomfort and worry to cause economical damage due to road blocking.

In the equation (1), the design live load is a predetermined value, and $K_t$ and $K_r$ are values that are experimentally or empirically determined, respectively. Thus, if it is supposed that the impact correction coefficient is assumed as one (1), the load carrying capacity of the bridge 10 can be estimated.

If the load carrying capacity of the bridge 10 is estimated, it can be decided whether or not the bridge should be repaired, reinforced or replaced based on the estimated load carrying capacity.

Next, a load carrying capacity estimation method for a bridge according to a second embodiment of the present invention will be described below.

Figure 7:
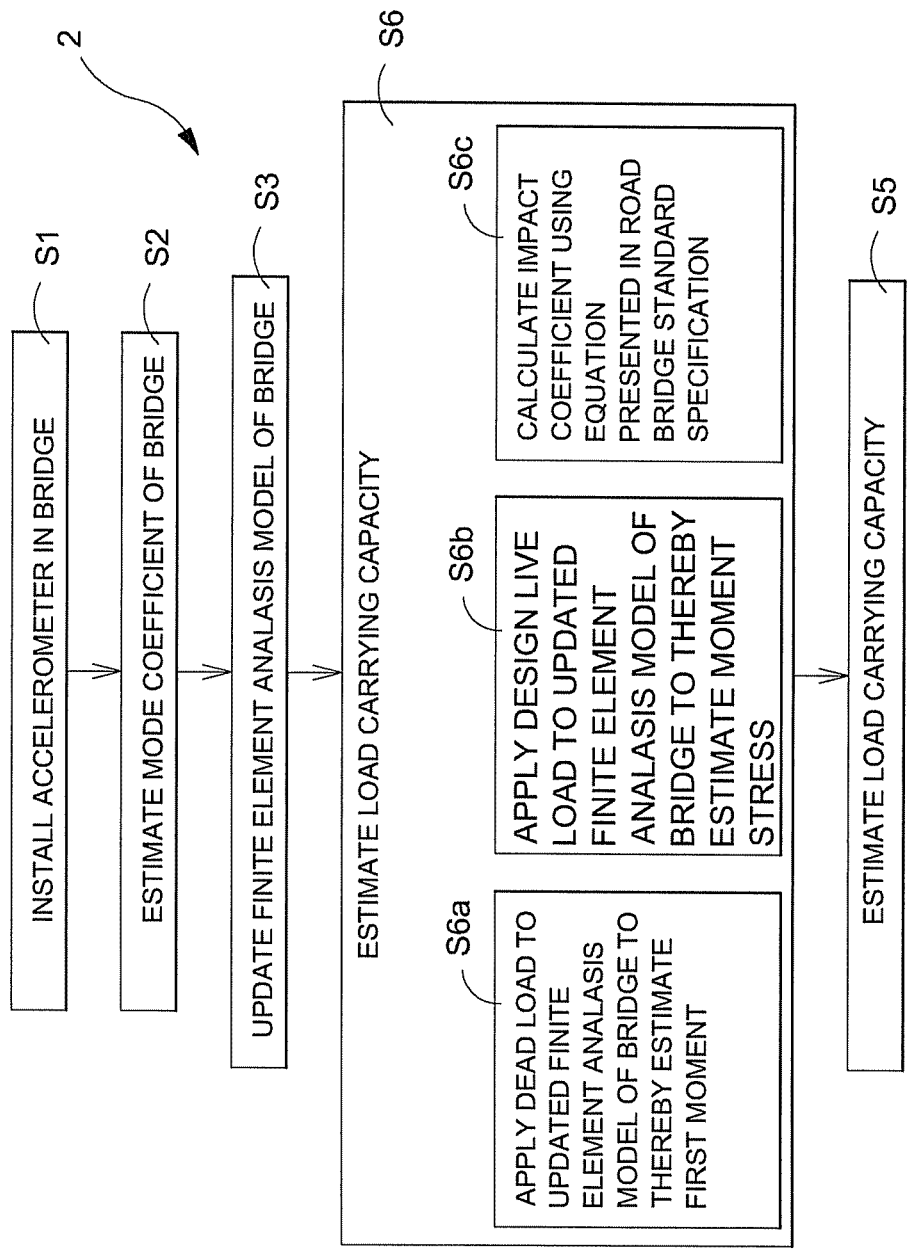
FIG. 7 is a flowchart view schematically showing a method of estimating a load carrying capacity of a bridge according to a second embodiment of the present invention.

FIG. 7 is a flowchart view schematically showing a method of estimating a load carrying capacity of a bridge according to a second embodiment of the present invention.

Referring to FIG. 7, a method 2 of estimating a load carrying capacity of a bridge according to the second embodiment of the present invention also includes an accelerometer installation step S1, a mode coefficient estimation step S2, an analysis model updating step S3, a rating factor estimating step S6 and a load carrying capacity estimation step S5.

The load carrying capacity estimation method 2 for the bridge according to the second embodiment of the present invention is very similar to the load carrying capacity estimation method 1 for the bridge according to the first embodiment of the present invention, except for the rating factor estimation step S6. Therefore, the specific explanation about the accelerometer installation step S1, the mode coefficient estimation step S2, the analysis model updating step S3 and the load carrying capacity estimation step S5 according to the second embodiment of the present invention will be omitted.

The rating factor estimation step S6 according to the second embodiment of the present invention is a step of estimating the rating factor by using a strength design method. Even in this second embodiment of the present invention, it is desirable that the rating factor is estimated with respect to the central portion of the bridge 10 that is predicted to be weak in the bridge 10, for example, at the central portion "C" of the finite element analysis model.

The rating factor estimation step S6 of this second embodiment of the present invention includes a first moment estimation step S6a, a second moment estimation step S6b, and an impact coefficient estimation step S6c.

The first moment is a bending moment acting on the central portion of the bridge 10 in the case that the dead load has been applied to the updated finite element analysis model, and the second moment is a bending moment acting on the central portion of the bridge 10 in the case that the design live load is applied to the updated finite element analysis model.

The impact coefficient is estimated by the mathematical expression (2) as in the first embodiment of the present invention.

The rating factor is expressed by the following equation (4) in this second embodiment of the present invention.

$$RF = \frac{\phi M_n - \gamma_d M_d}{\gamma_l M_l(1+i_{code})} \qquad (4)$$

Here, RF denotes a rating factor, $\phi$ denotes a strength reduction coefficient considering damage of a section, $M_n$ denotes a nominal resisting moment, $M_d$ denotes the first moment, $M_l$ denotes the second moment, denotes a $\gamma_d$ dead-weight coefficient, $\gamma_l$ denotes is a live load coefficient, and $i_{code}$ is an impact coefficient of the mathematical expression (2). In general, a value of $\gamma_d$ is determined as 1.3, a value of $\gamma_l$ is determined as 2.15.

The strength reduction coefficient $\phi$ is a strength reduction coefficient that is a qualitative coefficient for estimating a degree of damage such as a state of damage in the superstructure of the bridge, a load carrying capacity evaluation method, a spot measurement frequency, and existence and nonexistence of maintenance, and has a value of 0.57 through 0.94.

The first moment $M_d$ and the second moment $M_l$ are values that are obtained by applying the dead load and the design live load to the finite element analysis model that has been updated by using the actually measured acceleration. Therefore, the actual state of the bridge 10 has been reflected on the rating factor estimated in the second embodiment of the present invention. Accordingly, there is no need to separately obtain the deflection correction coefficient $K_\delta$ (or the stress correction coefficient $K_\epsilon$). That is, since the load carrying capacity estimation method 2 for the bridge according to this second embodiment of the present invention requires no loading test, there is no need to block roads.

Next, a load carrying capacity estimation method for a bridge according to a third embodiment of the present invention will be described below.

Figure 8:
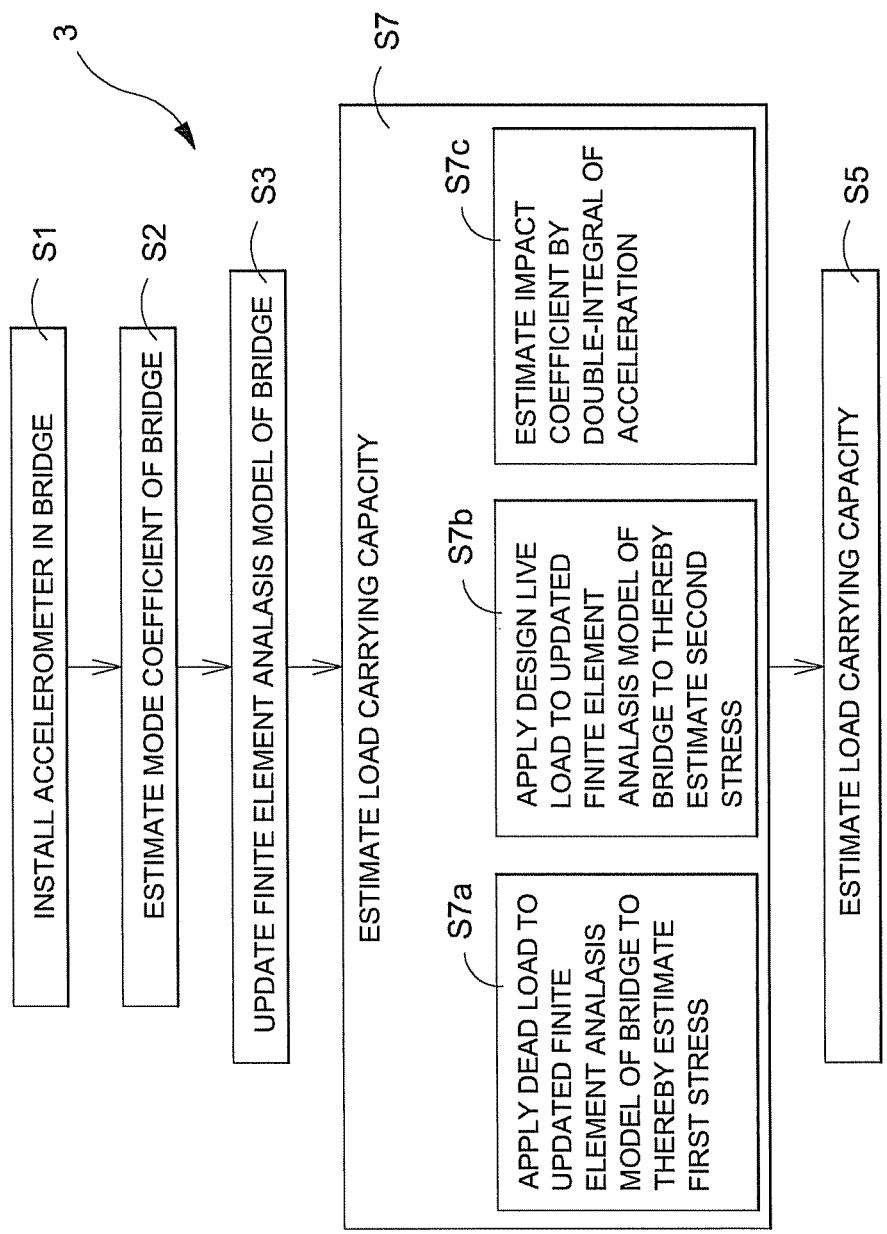
FIG. 8 is a flowchart view schematically showing a method of estimating a load carrying capacity of a bridge according to a third embodiment of the present invention.

FIG. 8 is a flowchart view schematically showing a method of estimating a load carrying capacity of a bridge according to a third embodiment of the present invention.

Referring to FIG. 8, a method 3 of estimating a load carrying capacity of a bridge according to the third embodiment of the present invention also includes an accelerometer installation step S1, a mode coefficient estimation step S2, an analysis model updating step S3, a rating factor estimating step S7 and a load carrying capacity estimation step S5.

The load carrying capacity estimation method 3 for the bridge according to the third embodiment of the present invention is substantially similar to the load carrying capacity estimation method 1 for the bridge according to the first embodiment of the present invention, except for the rating factor estimation step S7. Therefore, the specific explanation about the accelerometer installation step S1, the mode coefficient estimation step S2, the analysis model updating step S3 and the load carrying capacity estimation step S5 according to the third embodiment of the present invention will be omitted.

The rating factor estimation step S7 according to the third embodiment of the present invention is a step of estimating the rating factor by using a permission stress method, and includes a first stress estimation step S7a, a second stress estimation step S7b, and an impact coefficient estimation step S7c.

The first stress estimation step S7a and the second stress estimation step S7b according to the third embodiment of the present invention are the same as those of the first embodiment of the present invention. Accordingly, the detailed description thereof will not be omitted.

The impact coefficient estimation step S7c is a step of estimating an impact coefficient from acceleration that has been obtained by accelerometers 100a to 100k when a vehicle or vehicles pass the bridge.

In the case of the conventional load carrying capacity estimation method, the impact coefficient is estimated using the mathematical expression (2) that is presented in the road bridge standard specification, or estimated by the loading test.

In the case that the impact coefficient is estimated by the loading test, it can be expressed by the following equation (5).

$$i_{actual\ measurement} = \frac{\delta_d}{\delta_s} - 1 \quad (5)$$

Here, $\delta_d$ denotes a maximum value of dynamic displacement by a dynamic loading test, and $\delta_s$ denotes a maximum value of static displacement by a static loading test.

Meanwhile, in the case of the load carrying capacity estimation method 3 for the bridge according to this third embodiment of the present invention, acceleration that is obtained from the accelerometer 100a to 100k is doubly integrated, unlike the conventional load carrying capacity estimation method, to thereby obtain $\delta_d$ and $\delta_s$.

Since a vehicle or vehicles pass frequently on the bridge 10, oscillation is led to the bridge 10 according as a vehicle or vehicles pass thereon. In addition, deflection is led to the bridge 10 due to weight of the vehicle or vehicles while the vehicle or vehicles pass on the bridge 10. The acceleration by the oscillation that occurs in the bridge 10 when the vehicle or vehicles pass on the bridge 10 is measured, and doubly integrated in this third embodiment of the present invention. Accordingly, displacement by the oscillation and deflection of the bridge 10 is obtained.

Since displacement of the bridge 10 occurs most greatly at the central portion of the bridge 10, it is desirable that acceleration that is obtained from the accelerometer 100f that is installed at the central portion of the bridge 10 among a plurality of the accelerometers 100a to 100k is doubly integrated, to thus obtain displacement of the bridge 10.

Figure 9:
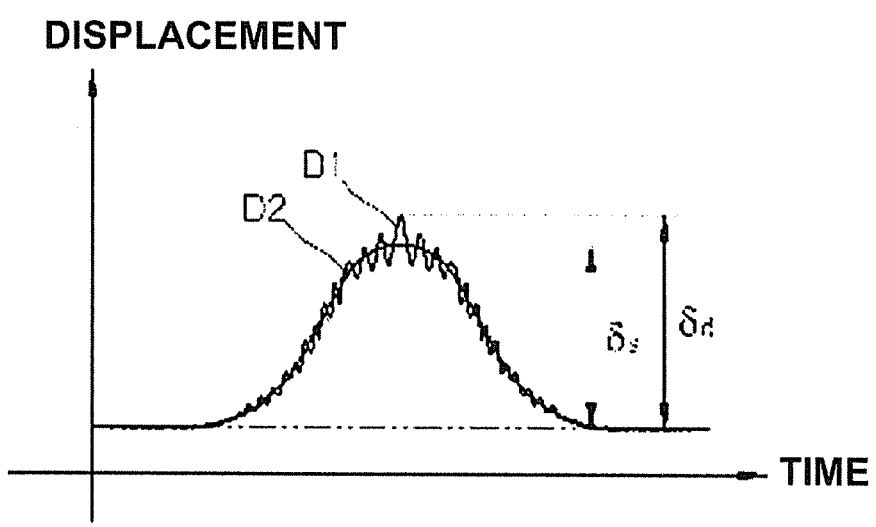
FIG. 9 is a graphical view schematically showing displacement of a bridge that is obtained from acceleration.

Referring to FIG. 9, displacement of the bridge 10 during passing of a vehicle or vehicles is illustrated as D1. D1 is a graph that is obtained by doubly integrating acceleration that is obtained from the accelerometer 100f that is installed at the central portion of the bridge 10, and represents displacement that is obtained by summing both the static displacement and the dynamic displacement of the bridge 10 according to passing of a vehicle or vehicles.

The maximum value of dynamic displacement $\delta_d$ that is included in the equation (5) is obtained by using D1, and becomes a value that corresponds to length from the lower portion of D1 to the uppermost portion of D1.

As illustrated in FIG. 9, D2 is obtained by applying a low-pass filter to D1. D2 is obtained by removing an oscillating component from displacement of the bridge 10 during passing of a vehicle or vehicles, and corresponds to pseudo-static displacement. Therefore, D2 can be regarded as a value corresponding to deflection of the bridge during passing of a vehicle or vehicles. Therefore, the maximum value of static displacement $\delta_s$ that is included in the equation (5) is obtained by using D2, and becomes a value that corresponds to length from the lower portion of D2 to the uppermost portion of D2.

Thus, if the maximum value of dynamic displacement $\delta_d$ and the maximum value of static displacement $\delta_s$ that are obtained as described above are substituted to the equation (5), the impact coefficient into which the actual state of the bridge 10 has been reflected can be obtained without performing a loading test.

If the impact coefficient is estimated, the rating factor is estimated using the equation (3), and the load carrying capacity is estimated by substituting the estimated rating factor to the equation (1). Because the first stress, the second stress and the impact coefficient into which an actual state of the bridge 10 has been reflected have been substituted to the estimated rating factor in this embodiment of the present invention, there is no need to estimate a stress correction coefficient $K_\epsilon$ and an impact correction coefficient $K_i$, separately. That is, the stress correction coefficient $K_\epsilon$ and the impact correction coefficient $K_i$, are set as one (1).

Thus, in the case of the load carrying capacity estimation method 3 for the bridge according to this third embodiment of the present invention, the load carrying capacity into which the actual state of the bridge 10 has been reflected can be estimated without performing the static and dynamic loading tests. Therefore, there is advantage that there is no need to intercept traffic of the bridge 10 in order to perform the loading tests.

Next, a load carrying capacity estimation method for a bridge according to a fourth embodiment of the present invention will be described below.

Figure 10:
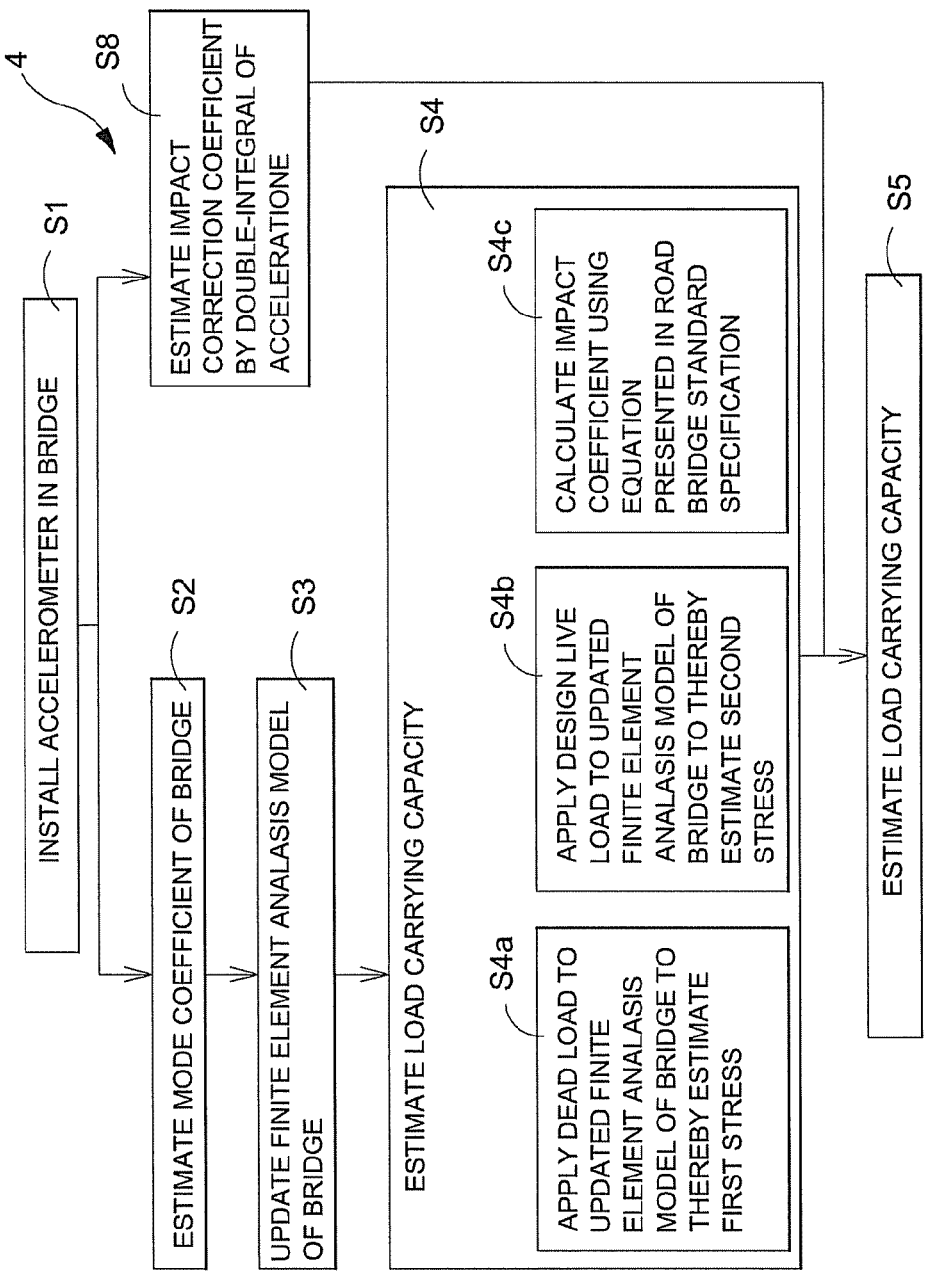
FIG. 10 is a flowchart view schematically showing a method of estimating a load carrying capacity of a bridge according to a fourth embodiment of the present invention.

FIG. 10 is a flowchart view schematically showing a method of estimating a load carrying capacity of a bridge according to a fourth embodiment of the present invention.

Referring to FIG. 10, a method 4 of estimating a load carrying capacity of a bridge according to the fourth embodiment of the present invention also includes an accelerometer installation step S1, a mode coefficient estimation step S2, an analysis model updating step S3, a rating factor estimating step S4, an impact correction coefficient estimation step S8 and a load carrying capacity estimation step S5.

Since the accelerometer installation step S1, the mode coefficient estimation step S2, the analysis model updating step S3 and the rating factor estimating step S4 according to the third embodiment of the present invention is vary similar to those of the load carrying capacity estimation method 1 for the bridge according to the first embodiment of the present invention, the specific description thereof will be omitted.

The rating factor estimation step S4 according to the fourth embodiment of the present invention is substantially same as that of the load carrying capacity estimation method 1 for the bridge according to the first embodiment of the present invention. As a result, an actual stress state of the bridge 10 has been reflected into the rating factor even in the case of the fourth embodiment of the present invention. Therefore, the stress correction coefficient is determined as one (1) with no need to estimate it separately.

By the way, because the impact coefficient determined by the mathematical expression (2) that is presented in the road bridge standard specification is substituted to the rating factor according to the fourth embodiment of the present invention, there is a need to introduce an impact correction coefficient that can reflect an actual state of the bridge 10, in order to estimate the load carrying capacity more exactly.

The impact correction coefficient estimation step S8 of the fourth embodiment of the present invention is a step of estimating an impact correction coefficient using actually measured acceleration so as to reflect the actual state of the bridge 10. The impact correction coefficient is expressed by the following equation (6).

$$K_i = \frac{1 + i_{code}}{1 + i_{actual\ measurement}} \quad (6)$$

Here, $K_i$ denotes the impact correction coefficient, and $i_{code}$ denotes the impact coefficient by the mathematical expression (2). Since $i_{actual\ measurement}$ has the same value as that of the $i_{actual\ measurement}$ of the load carrying capacity estimation method 3 for the bridge according to this third embodiment of the present invention, it is obtained using the maximum value of dynamic displacement $\delta_d$ and the maximum value of static displacement $\delta_s$ that are obtained by doubly integrating the actually measured acceleration.

Thus, the load carrying capacity estimation method 4 for the bridge according to the fourth embodiment of the present invention is advantageous in a point of estimating a real load carrying capacity of the bridge without performing the loading tests as in the cases of the load carrying capacity estimation methods 1, 2, and 3 for the bridge according to the first to third embodiments of the present invention.

Meanwhile, the above-described embodiments of the present invention have been described with respect to the cases of estimating the load carrying capacity of the bridge 10 of a single span, but the load carrying capacity estimation method for the bridge according to this invention can be applied to a bridge of multiple spans. As well, the load carrying capacity estimation method for the bridge according to this invention can be can be applied to various types of bridges such as a suspension bridge or a cable stayed bridge.

In addition, the load carrying capacity estimation methods 3 and 4 for the bridge according to the third and fourth embodiments of the present invention have been described with respect to the case that the rating factor is calculated by the permission stress method, but the rating factor can be calculated by the strength design method.

As described above, the load carrying capacity estimation methods 1, 2, 3, and 4 for the bridge according to the first to fourth embodiments of the present invention have been described, but this invention is not limited hereupon, and can be embodied in various forms within the scope of the technological thought of this invention.

What is claimed is:

1. A method of estimating a load carrying capacity of a bridge, the load carrying capacity estimation method comprising:
    estimating, by a processor, a mode coefficient of the bridge using an acceleration signal supplied from an accelerometer that is installed in the bridge;
    updating, by the processor, an analysis model of the bridge using the estimated mode coefficient;
    applying, by the processor, a dead load to the updated analysis model, to estimate a first stress that is generated in the bridge using the dead load applied to the updated analysis model;
    applying, by the processor, a design live load to the updated analysis model, to estimate a second stress that is generated in the bridge using the design live load applied to the updated analysis model;
    estimating, by the processor, a rating factor of the bridge by a permission stress method using the first stress and the second stress;
    estimating, by the processor, the load carrying capacity of the bridge using the design live load and the rating factor of the bridge;
    doubly integrating, by the processor, the acceleration signal when a vehicle or vehicles pass the bridge to estimate displacement of the bridge during passing of the vehicle or vehicles;
    applying, by the processor, the dynamic displacement to a low-pass filter, to estimate static displacement of the bridge; and
    obtaining, by the processor, an impact coefficient from the dynamic and static displacement of the bridge in which the impact coefficient is a ratio of a difference between the dynamic displacement and the static displacement with respect to the static displacement,
    wherein the load carrying capacity of the bridge is estimated using the design live load, the rating factor, and the impact coefficient of the bridge.

2. A method of estimating a load carrying capacity of a bridge, the load carrying capacity estimation method comprising:
    estimating, by a processor, a mode coefficient of the bridge using an acceleration signal supplied from an accelerometer that is installed in the bridge;
    updating, by the processor, an analysis model of the bridge using the estimated mode coefficient;

applying, by the processor, a dead load to the updated analysis model, to estimate a first stress that is generated in the bridge using the dead load applied to the updated analysis model;

applying, by the processor, a design live load to the updated analysis model, to estimate a second stress that is generated in the bridge using the design live load applied to the updated analysis model;

estimating, by the processor, a rating factor of the bridge by a permission stress method using the first stress and the second stress;

estimating, by the processor, the load carrying capacity of the bridge using the design live load and the rating factor of the bridge;

doubly integrating, by the processor, the acceleration signal when a vehicle or vehicles pass the bridge to thereby estimate dynamic displacement of the bridge during passing of the vehicle or vehicles;

applying, by the processor, the dynamic displacement to a low-pass filter to estimate static displacement of the bridge;

obtaining, by the processor, a first impact coefficient from the dynamic and static displacement of the bridge, in which the first impact coefficient is a ratio of a difference between the dynamic displacement and the static displacement with respect to the static displacement;

obtaining, by the processor, a second impact coefficient that is determined by the length of the bridge; and estimating, by the processor, an impact correction coefficient using the first and second impact coefficients, wherein the load carrying capacity of the bridge is estimated using the design live load, the rating factor, and the impact correction coefficient of the bridge.

3. A method of estimating a load carrying capacity of a bridge, the load carrying capacity estimation method comprising:

estimating, by a processor, a mode coefficient of the bridge using an acceleration signal supplied from an accelerometer that is installed in the bridge;

updating, by the processor, an analysis model of the bridge so that the estimated mode coefficient is close to mode coefficient stored;

applying, by the processor, a dead load to the updated analysis model, to thereby estimate a first moment that is generated in the bridge using the dead load applied to the updated analysis model;

applying, by the processor, a design live load to the updated analysis model, to thereby estimate a second moment that is generated in the bridge, by using the design live load applied to the updated analysis model;

estimating a rating factor of the bridge by a strength design method by using the first and second moments;

estimating, by the processor, the load carrying capacity of the bride using the design live load and the rating factor of the bridge;

doubly integrating, by the processor, the acceleration signal when a vehicle or vehicles pass the bridge to estimate dynamic displacement of the bridge during passing of the vehicle or vehicles;

applying, by the processor, the dynamic displacement to a low-pass filter, to estimate static displacement of the bridge; and obtaining, by the processor, an impact coefficient from the dynamic and static displacement of the bridge, in which the impact coefficient is a ratio of a difference between the dynamic displacement and the static displacement, with respect to the static displacement, wherein the load carrying capacity of the bridge is estimated using the design live load, the rating factor, and the impact coefficient of the bridge.

4. A method of estimating a load carrying capacity of a bridge, the load carrying capacity estimation method comprising:

estimating, by a processor, a mode coefficient of the bridge using an acceleration signal supplied from an accelerometer that is installed in the bridge;

updating, by the processor, an analysis model of the bridge so that the estimated mode coefficient is close to mode coefficient stored;

applying, by the processor, a dead load to the updated analysis model, to thereby estimate a first moment that is generated in the bridge using the dead load applied to the updated analysis model;

applying, by the processor, a design live load to the updated analysis model, to thereby estimate a second moment that is generated in the bridge, by using the design live load applied to the updated analysis model;

estimating a rating factor of the bridge by a strength design method by using the first and second moments;

estimating, by the processor, the load carrying capacity of the bridge using the design live load and the rating factor of the bridge;

doubly integrating, by the processor, the acceleration signal when a vehicle or vehicles pass the bridge to estimate dynamic displacement of the bridge during passing of the vehicle or vehicles;

applying, by the processor, the dynamic displacement to a low-pass filter, to estimate static displacement of the bridge;

obtaining, by the processor, a first impact coefficient from the dynamic and static displacement of the bridge, in which the impact coefficient is a ratio of a difference between the dynamic displacement and the static displacement, with respect to the static displacement;

obtaining, by the processor, a second impact coefficient that is determined by the length of the bridge; and estimating, by the processor, an impact correction coefficient by using the first and second impact coefficients, wherein the load carrying capacity of the bridge is estimated using the design live load, the rating factor, and the impact correction coefficient of the bridge.

* * * * *